Patented May 16, 1933

1,909,833

UNITED STATES PATENT OFFICE

ADOLF JOHANNSEN, OF LUDWIGSHAFEN-ON-THE-RHINE, GERMANY, ASSIGNOR TO GENERAL ANILINE WORKS, INC., OF NEW YORK, N. Y., A CORPORATION OF DELAWARE

MANUFACTURE OF ALDEHYDES

No Drawing. Application filed March 17, 1927, Serial No. 176,293, and in Germany March 19, 1926.

I have found that aldehydes can be prepared in a simple manner from carboxylic acids by acting on the latter at elevated temperatures and in the presence of catalysts with carbon monoxid. In this way for example benzaldehyde can readily be prepared from benzoic acid and acetaldehyde from acetic acid.

As catalysts especially suitable for this reaction the elements suitable for use as hydrogenating catalysts or mixtures of such elements may be mentioned. These catalysts may be activated by an addition of other elements or their compounds. As examples of very suitable contact masses which may be employed with good result, the elements of the 5th to 11th group of the periodic system (as suggested by Paneth, Zeitschrift für angewandte Chemie, 1923, volume 36, page 409 Tab. 2), for instance, chromium, iron, copper, manganese, and cobalt or their oxids, either alone or in mixture with each other, may be mentioned. These catalysts give particularly good results when employed in mixture with other elements, for example lead, glucinum, cerium, uranium, or zinc, or oxids of these elements which will be referred to as "activating substances."

The temperatures to be employed may vary within rather wide limits. The most suitable temperatures will generally range between about 200° to 550° C. preferably 250° to 500° C. The reaction may be carried out under any desired pressure.

The proportions of carboxylic acid and carbon monoxid need not be in the ratio theoretically required, but may be varied within wide limits. The materials not consumed in the reaction may again be introduced into the process in a circulatory system. Inert gases or vapors may be present in addition to carbon monoxid.

The following examples will further illustrate how my invention may be carried out in practice, but the invention is not limited to these examples.

Example 1

Benzoic acid vapor is mixed with carbon monoxid in an amount sufficient for the reduction and the mixture passed at 400° C. over an iron catalyst. Benzaldehyde is obtained in a good yield.

Example 2

Acetic acid vapor is passed together with carbon monoxid over a catalyst consisting of cobalt and iron and heated to 280° C. Acetaldehyde is produced and can be recovered from the reaction mixture by cooling or washing.

Example 3

A gas mixture consisting of equal parts, by volume, of carbon monoxid and nitrogen is passed over benzoic acid heated to 180° C. The resulting gas and vapor mixture is passed at 360° to 390° C. over a catalyst prepared by reducing an intimate mixture of chromium oxid and iron oxid. On cooling the reaction gases benzaldehyde is separated along with unaltered benzoic acid.

Producer gas or blast furnace gas may also be employed instead of the said gas mixture.

Example 4

A gas mixture consisting, by volume, of 60 per cent of carbon monoxid, 30 per cent of nitrogen and 10 per cent of water vapor is mixed with benzoic acid vapor and passed at 380° to 400° C. over a catalyst containing cerium, chromium and iron. Benzaldehyde together with some unaltered benzoic acid and benzene can be separated from the reaction gases in any suitable manner.

The nitrogen contained in the said gas mixture may be replaced wholly or in part by carbon dioxid.

Other carboxylic acids can be converted into aldehydes in a similar manner.

I claim:

1. The process of producing aldehydes which comprises acting carbon monoxide on a carboxylic acid at a temperature between about 200° to 550° C. and in the presence of a hydrogenating catalyst comprising at least one element selected from the 5th to the 11th group of the Paneth periodic system.

2. The process of producing aldehydes which comprises acting carbon monoxide on a carboxylic acid at a temperature ranging between about 200° to 550° C. and in the presence of a hydrogenating catalyst comprising at least one element selected from the 5th to the 11th group of the Paneth periodic system, and an activating substance selected from the group consisting of lead, glucinum, cerium, uranium, zinc, and oxids of these elements.

3. The process of producing aldehydes which comprises acting gases containing carbon monoxide on a carboxylic acid at a temperature ranging between about 200° to 500° C. and in the presence of a hydrogenating catalyst comprising at least one element selected from the 5th to the 11th group of the Paneth periodic system.

4. The process of producing aldehydes which comprises acting carbon monoxide on a carboxylic acid at a temperature ranging between about 200° and 550° C. in the presence of a hydrogenating catalyst comprising at least one of the metals selected from the group consisting of chromium, iron, copper, manganese and cobalt.

5. The process of producing aldehydes which comprises acting gases containing carbon monoxid on a carboxylic acid at a temperature ranging between about 200° to 550° C., and in the presence of a hydrogenating catalyst comprising two metals selected from the group consisting of chromium, iron, copper, manganese and cobalt.

6. The process of producing aldehydes which comprises acting gases containing carbon monoxid on a carboxylic acid at a temperature ranging between about 200° to 550° C., and in the presence of a hydrogenating catalyst comprising chromium.

7. The process of producing benzaldehyde which comprises acting gases containing carbon monoxid on benzoic acid at a temperature between about 360° and 400° C. in the presence of a hydrogenating catalyst comprising chromium and iron.

8. The process of producing aldehydes which comprises acting gases containing carbon monoxide on a carboxylic acid a temperature ranging between 200° and 500° C. and in the presence of a hydrogenating catalyst comprising at least one of the metals selected from the group consisting of chromium, iron, copper, manganese and cobalt, and an activating substance selected from the group consisting of lead, glucinum, cerium, uranium and zinc and oxids of these elements.

9. The process of producing aldehydes which comprises acting gases containing carbon monoxide on a carboxylic acid at a temperature ranging between 200° and 500° C. and in the presence of a hydrogenating catalyst comprising chromium, iron and cerium.

In testimony whereof I have hereunto set my hand.

ADOLF JOHANNSEN.